United States Patent [19]
Blow et al.

[11] Patent Number: 5,307,428
[45] Date of Patent: Apr. 26, 1994

[54] OPTICAL DOMAIN DIGITAL PULSE SWITCHING

[75] Inventors: Keith J. Blow; Nicholas J. Doran; Brian P. Nelson, all of Suffolk, England

[73] Assignee: British Telecommunications public limited company, London, England

[21] Appl. No.: 949,888

[22] PCT Filed: Mar. 26, 1991

[86] PCT No.: PCT/GB91/00453
 § 371 Date: Nov. 24, 1992
 § 102(e) Date: Nov. 24, 1992

[87] PCT Pub. No.: WO91/14963
 PCT Pub. Date: Oct. 3, 1991

[30] Foreign Application Priority Data
Mar. 26, 1990 [GB] United Kingdom ............... 9006675

[51] Int. Cl.⁵ ............................................. G02B 6/26
[52] U.S. Cl. ....................................... 385/11; 385/31; 385/24
[58] Field of Search ............... 385/11, 29, 31, 32, 385/24

[56] References Cited
U.S. PATENT DOCUMENTS 4,468,090  8/1984  Ulrich et al. ............... 385/29 X
4,469,397  9/1984  Shaw et al. ................ 385/11 X
4,720,162  1/1988  Mochizuki et al. .......... 385/11 X
5,050,183  9/1991  Duling, III ................. 385/32 X

OTHER PUBLICATIONS

*Optics Letters*, vol. 14, No. 14, Jul. 15, 1989, Optical Society of America, Blow et al: "Experimental demonstration of optical soliton switching in an all-fiber nonlinear Sagnac interferometer," pp. 754–756.

*Applied Physics Letters*, vol. 55, No. 1, Jul. 3, 1989, (New York, US), Farries et al: "Optical fiber switch employing a Sagnac interferometer," pp. 25–26.

Primary Examiner—John D. Lee
Assistant Examiner—Phan T. Heartney
Attorney, Agent, or Firm—Nixon & Vanderhye

[57] ABSTRACT

An optical apparatus including a first optical coupling having a first and a second pair of optical communication ports in which substantially equal portions of an optical signal received at a port of one pair of ports are coupled to each port of the other pair of ports; an optical waveguide optically coupling the second pair of ports such that an optical signal leaving either one of the second pair of ports in a first polarization state; a second optical coupling for coupling an optical signal at a second wavelength to the optical waveguide so as to propagate along at least a portion of it in one direction only; and first and second polarizing beam splitters optically coupled to a respective one of the first pair of ports.

10 Claims, 5 Drawing Sheets

DFB PULSES
AT MAX. TRANSMISSION

MIN. TRANSMISSION
PULSES SWITCHED
'THROUGH' BY 1·3

MAX. TRANSMISSION
PULSES SWITCHED
OUT BY 1·3

100 ps/div

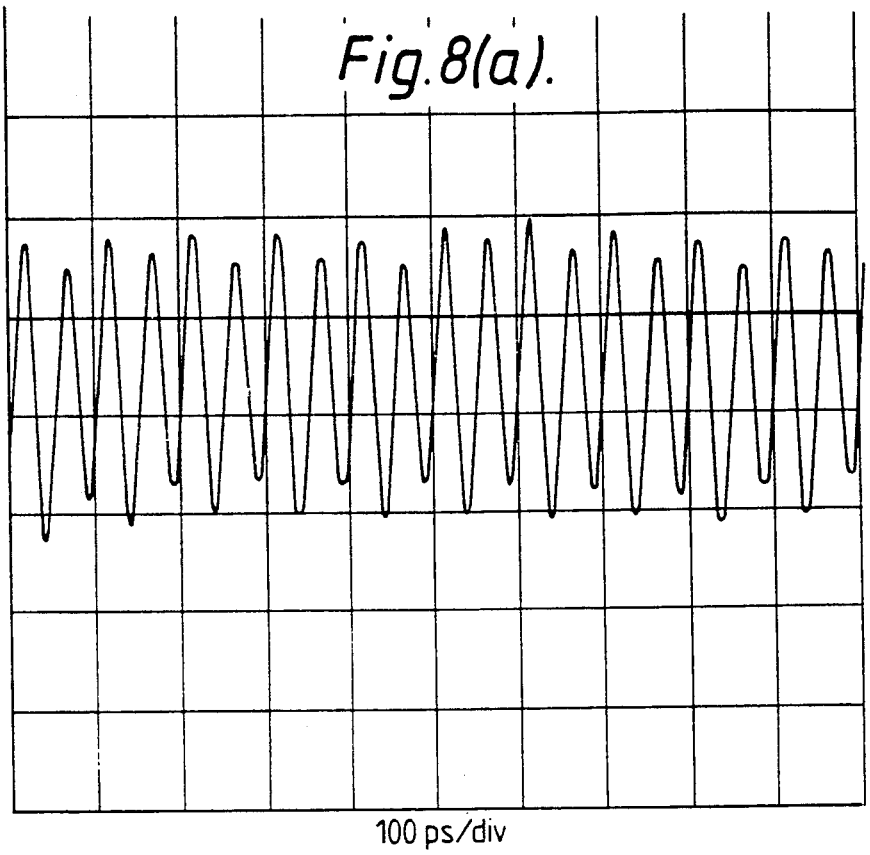
100 ps/div
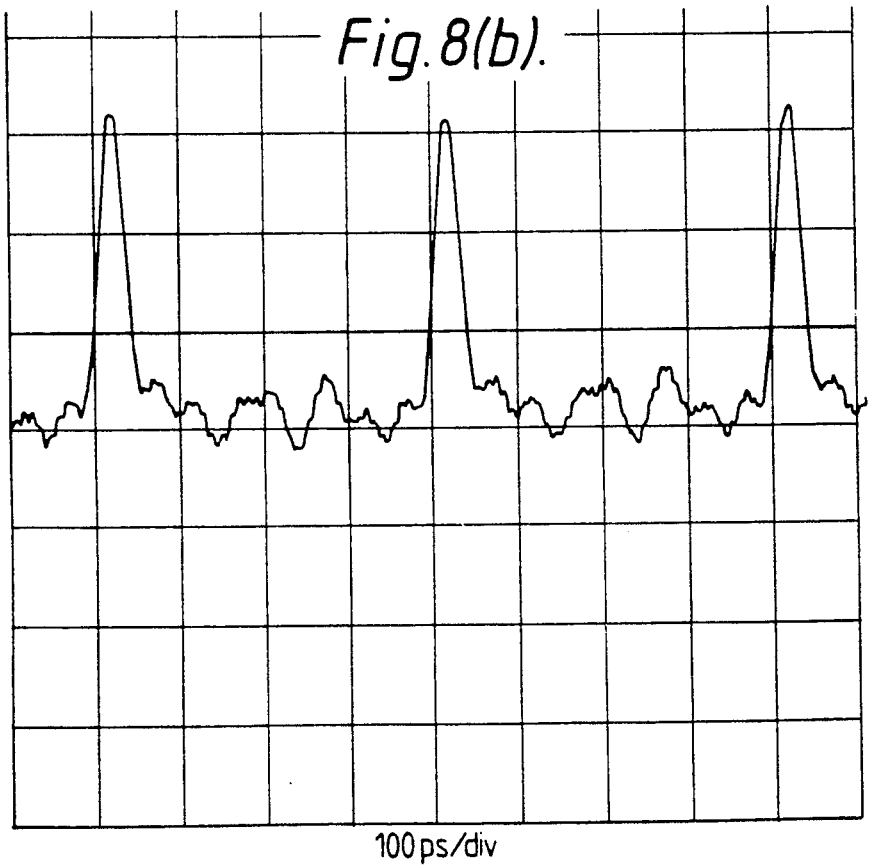
100 ps/div

OPTICAL DOMAIN DIGITAL PULSE SWITCHING

BACKGROUND OF THE INVENTION

1. Field of the Invention

This invention relates to optical apparatus of particular, but not exclusive, application to routing pulsed optical signals.

2. Related Art

In time division multiplexed communication systems there is a need to perform operations on selected bits of data, which operations include removing and inserting bits in selected time slots from, and into, a received optical data stream. The present invention seeks to provide an optical routing device which can perform such operations in the optical regime, i.e., without the need to convert the data stream to an equivalent electrical data stream upon which the operations are performed.

SUMMARY OF THE INVENTION

The present invention provides an optical apparatus comprising a first optical coupling means having first and second pairs of optical communication ports, in which substantially equal portions of an optical signal received at a port of one pair of ports are coupled to each port of the other pair of ports; an optical waveguide means optically coupling the second pair of ports such that an optical signal at a first wavelength leaving either one of the second pair of ports in a first polarization state arrives at the other port of that pair in a second polarization state substantially orthogonal to the first polarization state; a second optical coupling means for coupling an optical signal at a second wavelength to the optical waveguide so as to propagate along at least a portion of it in one direction only; and first and second polarizing beam splitters, each of which is optically coupled to a respective one of the first pair of ports.

The optical waveguide forms a waveguide loop coupling the second pair of ports.

In this application, by material having a non-linear refractive index it is meant the refractive index of the material varies with the intensity of the transmitted signal. Typically the refractive index n is given by the formula $n + n_0 \pm n_2|E|^2$ where $n_0$ is the linear refractive index, $n_2$ is the Kerr coefficient and $|E|^2$ the intensity of the transmitted signal.

The polarisation controller is adjusted so that the polarization state of a signal portion when it arrives at the first optical coupling means, after propagating around the optical waveguide loop, is orthogonal to the polarization state it had when it left the first optical coupling means before propagating around the loop whichever way round the loop it propagates.

The first optical coupling means and the optical waveguide loop form a Sagnac anti-resonant interferometer which acts (in the absence of a signal at the second wavelength) as a Mach-Zehnder interferometer to optical signals at the first wavelength. Because the counter-propagating pulses have different polarization states in the loop between the polarization controllers, they will in general experience different optical path lengths. If the counter-propagating portions arrive at the coupler in phase, a signal entering the coupler at a first port will be reflected, i.e. it will exit the coupler at the same port, if $\pi$ radians out of phase it will be transmitted, i.e. it will exit the coupler at the other port.

When an optical signal at the second wavelength of appropriate intensity (a control signal) is coupled to the optical waveguide so as to propagate along it in one direction only, the portion of a co-propagating optical signal can be made to experience a phase shift relative to a portion propagating without the control signal round the loop in the other direction. This is additional to any phase difference which occurs in the absence of the control signal. Thus, an optical signal coupled to an input port of the coupler will be transmitted or reflected rather than vice-versa in the presence of the control signal.

The first optical coupling means is conveniently a dichroic optical coupler coupling most of an optical signal received at one port of the first pair of ports at the second wavelength to one port of the other pair, the second optical coupling means being positioned between the first polarizing beam splitter and the respective port of the first optical coupling means.

Polarization maintaining fibre may be used to form an optical waveguide loop. In this case, two polarisation controllers are needed to ensure optical signals from each port of the second pair of ports propagate round the loop in a respective one of the propagation modes. In this case, the apparatus preferably includes means for adjusting the relative optical path length of the counter-propagating signals, for example a fibre stretcher when the optical waveguide is an optical fibre. The Sagnac loop can then be adjusted so that the counter-propagating portion arrives back at the coupler in phase or $\pi$ out of phase, in the absence of the optical control signal, as desired.

In the latter case, the Sagnac loop will be transmitting in the absence of the optical control signal and reflective when it is present.

The loop may comprise standard, non-polarisation-maintaining fibre, in which case a polarisation controller alone can be used to set the desired propagation characteristics of the fibre.

The control of the polarisation of the optical signals within the loop means that transmitted and reflected signals from the Sagnac loop interferometer can be distinguished from the input optical signals by their polarisation state by the polarizing beam splitters which, as will be explained below, allows the apparatus to perform the described insert and drop routing functions.

The first optical coupling means is conveniently a dichroic optical coupler coupling optical apparatus in which the optical fibre is polarisation-maintaining fibre, and there is further included a second polarisation controller.

Alternatively, the control optical signal could be introduced and extracted at each end of the loop waveguide by means of a pair of wavelength multiplexing-/demultiplexing couplers.

BRIEF SUMMARY OF THE DRAWINGS

The invention and its principle of operation will now be described, by way of example only, with reference to the accompanying drawings of which.

DETAILED DESCRIPTION OF PREFERRED EMBODIMENTS

Figure 1:
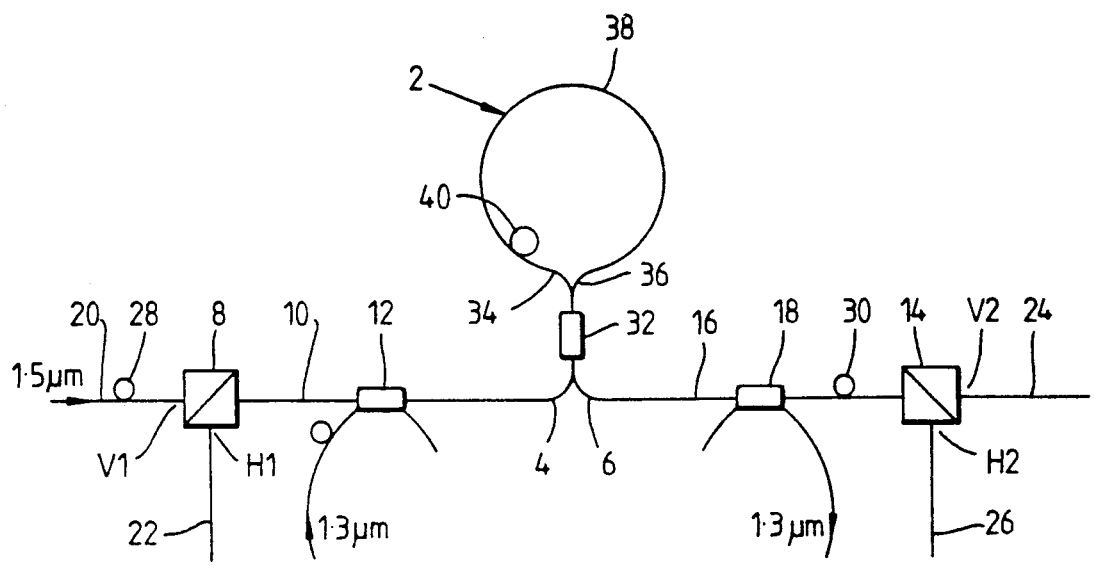
FIG. 1 is a schematic diagram of a first embodiment of an optical routing apparatus according to the present invention.

Referring to FIG. 1, an optical routing apparatus comprises a Sagnac loop reflector—often referred to as a non-linear optical loop mirror (NOLM)—2 having a first pair of optical communication ports 4 and 6. The port 4 is coupled to a first polarizing beam splitter 8 via an optical fibre 10 into which is spliced a first wavelength multiplexing coupler 12. The port 6 is similarly coupled to a second polarizing beam splitter 14 via an optical fibre 16 into which is spliced a second wavelength multiplexing coupler 18.

The polarizing beam splitters 8 and 14 may be bulk optical devices or waveguide devices.

Optical fibres 20 and 22 are optically coupled to the polarizing beam splitter 8 so that vertically polarised optical signals pass between the fibres 20 and 10, whilst horizontally polarised optical signals pass between the fibres 22 and 10.

Similarly, optical fibres 24 and 26 are optically coupled to the polarizing beam splitter 14 so that vertically polarized signals pass between the fibres 16 and 24, whilst horizontally polarized signals pass between the fibres 16 and 26.

In this embodiment, an input optical data stream to be routed is assumed to propagate along the fibre 20 towards the beam splitter 8. A polarization controller 28 is used to ensure the data signal is vertically polarized on entering the beam splitter 8, so it will be coupled to the loop interferometer 2. In this embodiment the optical data stream is at a wavelength of about 1.5 $\mu$m.

A source (not shown) of an optical signal of about 1.3 $\mu$m is couplable into the fibre 10 by the wavelength multiplexing coupler 12.

As will be explained below, transmitted optical signals from the loop interferometer 2 will be horizontally polarized on leaving the port 6. Generally, however, their polarization will change as they propagate to the beam splitter 14. A polarization controller 30 is included near the beam splitter 14 to adjust the polarization of the transmitted optical signals to vertical or horizontal polarization depending on which of the fibres 24 and 26 is chosen as the output fibre for onward transmission of the data stream. In this case, it is assumed that the fibre 26 is the output fibre, so the polarization controller 30 is set to provide horizontal polarization at the beam splitter 14.

The multiplexing coupler 18 selectively couples out from the fibre 16 any control optical signal at the second wavelength of 1.3 $\mu$m.

The Sagnac loop 2 comprises a dichroic optical coupler 32, constituting a first optical coupling means, the loop having the ports 4 and 6 as a first pair of ports, and the ports 34 and 36 as a second pair of ports. The ports 34 and 36 are coupled by a loop of silica optical fibre 38. The coupler 32 is to be close to 50:50 coupling at 1.5 $\mu$m and 100:0 at 1.3 $\mu$m as possible for maximum efficiency and completeness of switching. The wavelengths chosen for operation are arbitrary. Others may be used if the couplers are selected appropriately.

A polarization controller 40 is positioned close to the port 34, and set such that an optical signal exiting either of the ports 34 and 36 will arrive at the other port in the orthogonal polarization. The counter-propagating portions of an optical signal at 1.5 $\mu$m will, in general, have an arbitrary phase relationship. If the interferometer 2 is to act as a reflector or as a transmitter, in the absence of a 1.3 $\mu$m signal, the relative phase difference should be 0 or $\pi$ radians respectively. In the embodiment of FIG. 1, the polarization controller 40 can be adjusted to obtain the required phase relationship.

Consider a stream of optical data signals vertically polarized at the beam splitter 8. The connection between the fibre 20 and the beam splitter 8 will be referred to as V1. The signal will be coupled to the port 4 of the interferometer 2, and will be reflected out of that port back to the beam splitter 8. The signal will be horizontally polarized due to the action of the polarization controller 40 and the reciprocal propagation conditions of the fibre 10. This horizontally polarized signal will, therefore, be connected by the polarizing beam splitter 8 to the fibre 22, which connection is referenced H1.

If a 1.3 $\mu$m optical control signal is coupled to the port 4 of the interferometer 2 via the coupler 12, it will propagate in substantially only one direction round the interaction section 38 because the coupler 32 is close to a 100:0 coupler at the second wavelength. The intensity is selected to provide sufficient cross phase modulation between the control signal and the co-propagating portion of the 1.5 $\mu$m signal to provide a $\pi$ radian relative phase shift between the co-propagating portions. The 1.5 $\mu$m signal, so affected, will now exit the interferometer at the port 6. As stated above, this signal is controlled to have a horizontal polarization by the polarization controller 30, and so will exit the beam splitter 14 to couple to the fibre 26. This connection is labelled H2. The connection between the beam splitter 14 and the fibre 24 is labelled V2.

The symmetric nature of the embodiment provides the following connection pattern for 1.5 $\mu$m signals, firstly without the 1.3 $\mu$m control signal:

```
V1 ----H2
H1 ----V2
V2 ----H1
H2 ----V1
``` and secondly with the 1.3 $\mu$m control signal:

```
V1 ----H1
H1 ---- V1
V2 ----H2
H2 ----V2
```

When the optical signal entering the connection V1 of the FIG. 1 embodiment is a stream of optical pulses, representing binary digits, a drop function can be performed by applying a control pulse which overlaps the pulse to be dropped. This pulse will be reflected by the interferometer 2 back to the beam splitter 8 to exit at H1. To perform an insert function, the pulse to be inserted is coupled to the interferometer 2 so that it coincides with a control pulse at the appropriate place in the data stream. The control pulse will cause the data to be inserted to exit at H2, with the rest of the data stream which has not been switched by the control pulse.

The drop function can be used for high bit rate, time division multiplexing, by applying a sequence of control pulses to the coupler 12 at a sub-multiple of the line rate. Packets of data can be dropped if a control signal the length of several bits is employed.

The embodiment of FIG. 1 can be operated in the mode in which the interferometer 2 is normally reflective in the absence of a control signal, i.e. the polarisation controller 40 is set so that counter-propagating pulses are in phase on reaching the coupler 32. In this case, the connection pattern for the presence and absence of a control signal is the converse of the previously described operation.

Figure 2:
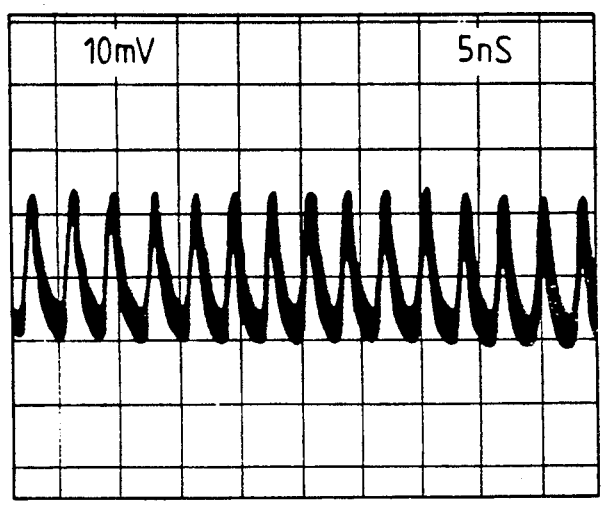
FIGS. 2 to 4 are graphs showing the output from the apparatus of FIGS. 1 and 2.
Figure 3:
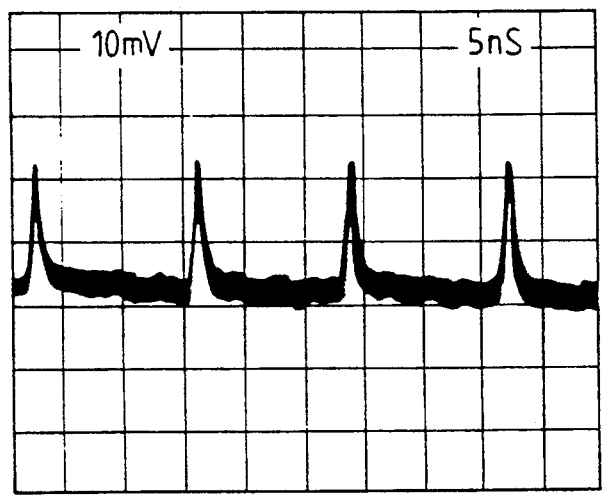
Figure 4:
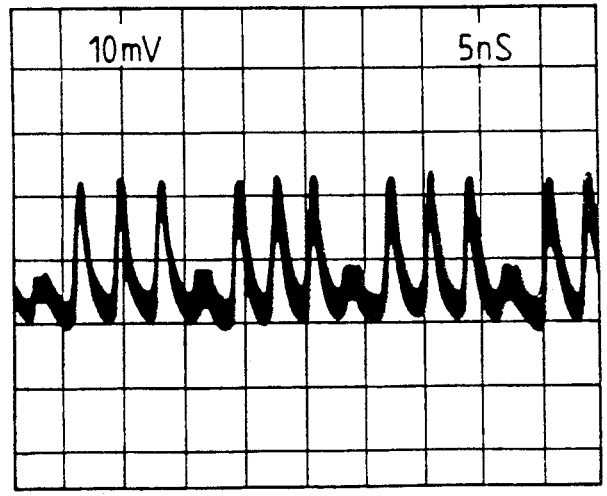

Referring now to FIGS. 2 to 4, there are shown graphs of the output pulses obtained from the embodiment of FIG. 1 measured after they pass from the coupler 18, in which the control signals at 1.3 μm comprise 130 ps pulses from a Nd:YAG laser, and the input signal to be switched comprises a pulsed, low power signal from a semiconductor DFB laser operating at 1.53 μm coupled at the port 4.

FIGS. 2 and 3 show the output of the DFB pulses at 1.53 μm from the ports 6 and 4 respectively. That is, the interferometer loop is set to transmit pulses from the port 4 to the port 6 in the absence of a control signal at 1.3 μm. FIG. 4 shows the DFB pulse switched to the port 6 by the presence of the control signal when the interferometer 2 is set to operate in reflective mode in the absence of a control signal.

FIG. 2 shows the DFB laser pulse detected when the Sagnac loop interferometer 2 is arranged to be transmitting in the absence of the 1.3 μm control signal and no control is present.

FIG. 3 shows the effect on the output at FIG. 2 of introducing the 1.3 μm control signals to the optical waveguide. Each fourth pulse is partially reflected by the Sagnac loop 2. Partial switching of the centre of the 1.53 μm pulses occurs because the control pulse is narrower than the 1.53 μm pulses.

FIG. 4 shows the DFB laser, 1.53 μm, pulses received after the coupler 18 in the presence of 1.3 μm control pulses when the Sagnac loop 2 is reflective in the absence of the control signals. In this case all 1.53 μm pulses are reflected except when a control pulse is present.

Figure 5:
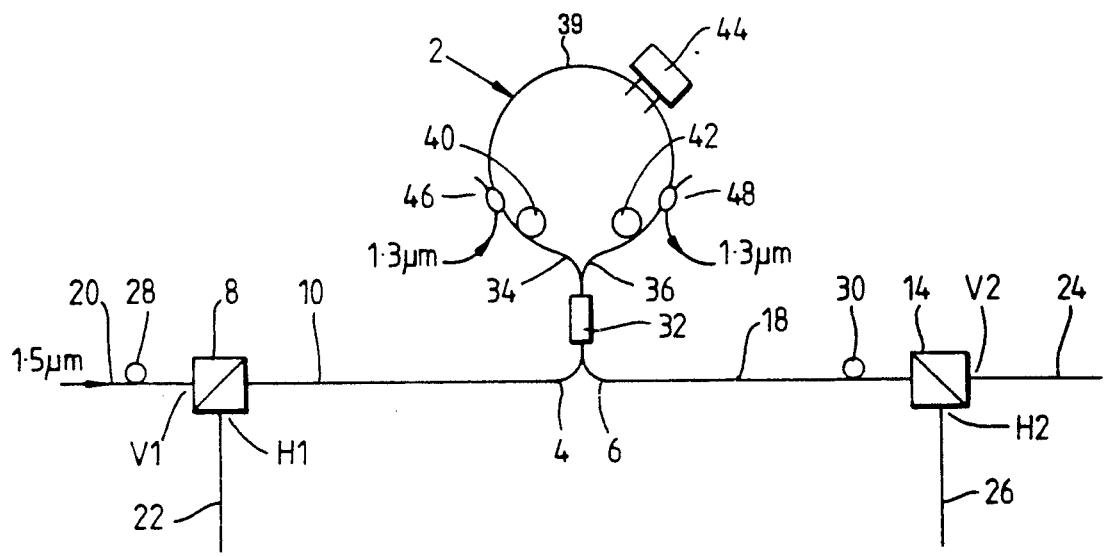
FIG. 5 is a schematic diagram of an embodiment of the present invention in which the control signal is confined to a portion of the interaction region.

FIG. 5 shows the arrangement of FIG. 1 but in which the waveguide connecting the ports 34 and 36 is a polarization-maintaining fibre 39, and there is a further polarization controller 42. The polarisation controllers 40 and 42 are set such that the one portion of an input signal coupled via the fibre 20 at 1.3 μm propagates round the fibre 39 in either the slow or fast axis of the fibre, the other, counter-propagating portion being in the other axis. The fibre 39 will then be more able to maintain the portion in the same polarisation state as the signals propagate round the fibre 39. One of the controllers 40 and 42 could be replaced by a polarisation controller adjacent to the port 4. A fibre stretcher 44 is attached to the polarization-maintaining fibre to provide a means for setting the required phase difference in the absence of a control signal.

The 1.5 μm control signal is inserted and extracted within the Sagnac loop via wavelength multiplexing couplers 46 and 48. The couplers 12 and 18 of FIG. 1 are, therefore, not needed. The operation is as for the FIG. 1 apparatus.

Figure 6:
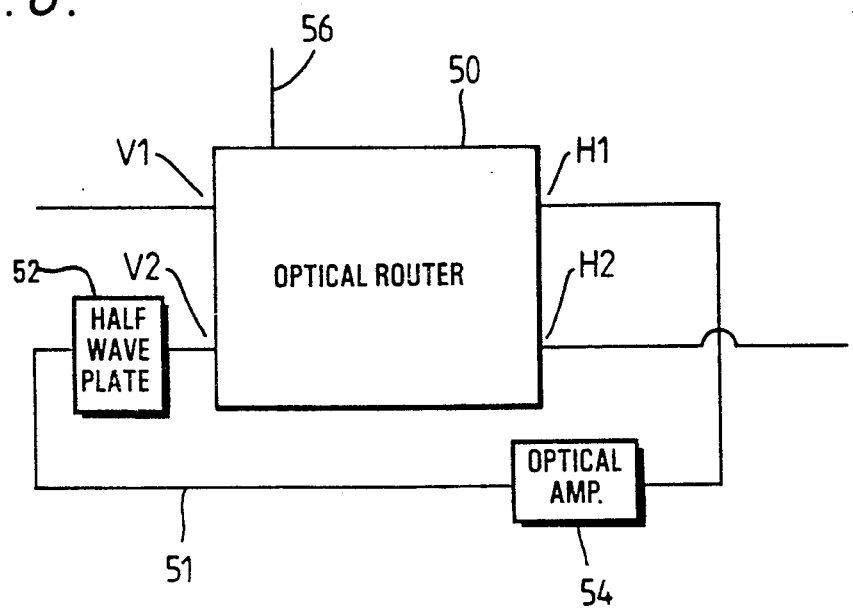
FIG. 6 is a schematic diagram of an optical memory using the optical apparatus of FIG. 1.

Referring now to FIG. 6, an optical memory comprises the embodiment of FIG. 1 shown as the optical router 50 with ports V1, H1, V2 and H2. The router 50 is set to be normally transmitting, i.e. V1 and H2 are coupled, and V2 and H1 are coupled. The port H1 is coupled externally to the port V1 by an optical waveguide 51 via a half-wave plate 52 and an optical amplifier 54. The half-wave plate 52 ensures optical signals coupled out from H1 can be coupled into the router 50 in the appropriate polarization state at V1. A polarization controller may be included if necessary. An optical control signal is applicable via an optical waveguide 56.

In the absence of a control signal, optical signals coupled to the port V1 will be coupled via the router 50 to the port H2, and the port V2 will be coupled to the port H1. When a control signal is present, the input at the port V1 will be switched to the port H1. Thus, if the input to the port V1 is a stream of optical pulses, they can be selectively switched to the waveguide 51. If the control signal is removed before a switched pulse reaches the port V2, the switched pulses will be coupled via the router 50 to the port H1, and so continue to circulate in the loop defined by the waveguide 51 and the router 50. The amplifier 54 maintains pulse intensity.

Similarly, if the control signal is applied at the appropriate time, pulses circulating in the loop will be switched out as the port V2 will be coupled to the port H2.

Other specific arrangements of optical memories will be realisable employing the present invention.

Figure 7:
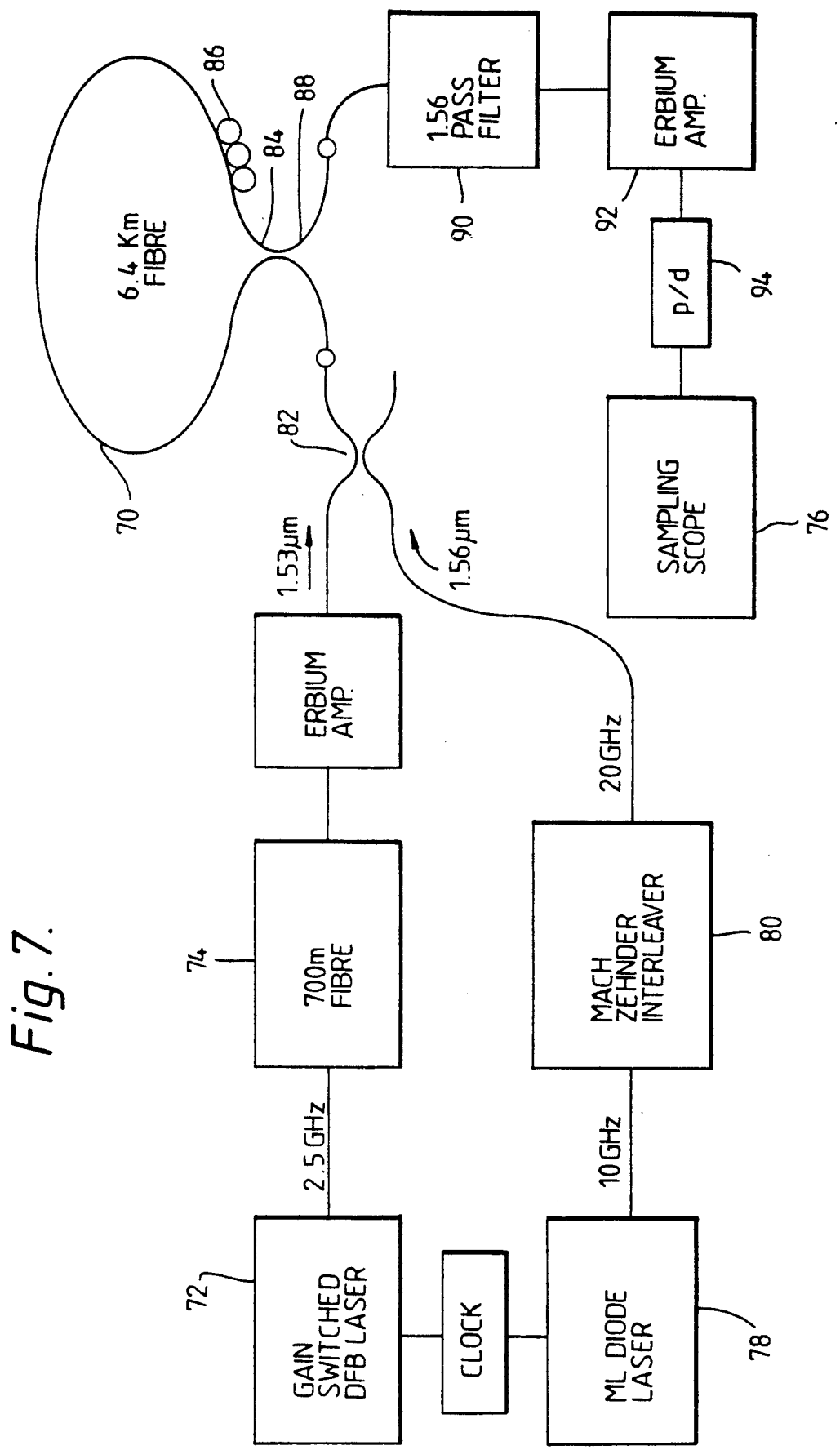
FIG. 7 is a schematic diagram of a further embodiment of the present invention.

A further embodiment of the present invention, and the results of optical pulse switching obtained with it, will now be described with reference to FIGS. 7 and 8(a) and 8(c).

The first target is to reduce the switching power required, so that semiconductor lasers may be used throughout the device. This can be achieved by increasing the length of the fibre loop used in the NOLM. The original experiment employed a 100 m loop, which required a peak power of 10 watts for complete switching. Increasing the loop length will proportionally reduce the required switching power, but how far it can be taken depends on, amongst other things, the stability of the loop for long lengths. In a series of experiments, we established that, using standard communications fibre, the loop was stable for a period of hours for lengths at least up to the loss length of silica. This means that the NOLM is the first non-linear fibre device which is capable of accessing the full potential of the silica non-linear figure of merit (the ratio of non-linear coefficient to loss). The loop employed in the current experiment was 6.4 km of standard dispersion shifted fibre 70, and stability measurements showed no significant drift over an hour. With this loop, the peak power required for complete switching was approximately 160 mW. This means that, for example, with a 10 ps pulse the switching power was only 1.6 pJ.

The next problem to address was the provision of a switching source and a signal source. The two wavelengths chosen for the experiment were 1.53 μm for the switching source and 1.56 μm for the signal source. These wavelengths were chosen to be both within the Er gain window, and to straddle the dispersion minimum of the fibre 70 to minimise the group delay difference between the two wavelengths. This difference in group delay causes one signal to 'walk through' the other signal, so that the effective switching pulse broadens. Therefore, at high bit rates, it was important to minimise this difference by ensuring that the wavelengths were set equally on opposite sides of the zero dispersion wavelength. This condition is easier to satisfy when the wavelengths are closely spaced, because the group delay function is slow moving near the zero dispersion wavelength, thus easing the tolerance requirements of the two wavelengths. Consequently, the fibre chosen for the loop had a zero dispersion wavelength at 1.545 μm.

The switching signal was generated from a gain switched DFB laser 72 driven at 2.5 GHz. The resulting pulses were then compressed using 700 m of negative group delay dispersion fibre 74. The full width half maximum (FWHM) of the pulses was 27 ps when displayed on a fast photodiode sampling oscilloscope detection system 76. Deconvolving the detection system response implies a pulse width of ~16 ps. These pulses were then amplified using a diode pumped erbium amplifier, which resulted in an average output power of 20 mW. Even allowing for losses in the following couplers, this is sufficient power to provide switching in a 6.4 km NOLM.

The signal source was a mode-locked diode laser 78 operating at 1.56 μm with a repetition rate of 10 GHz. These pulses were interleaved using a fibre Mach-Zehnder 80 to produce a 20 GHz pulse train. The two wavelengths were then combined using a WDM coupler 82, and launched into the loop 70. The loop 70 was constructed from a coupler 84 which has a 50:50 coupling ratio for the 1.56 μm signal and 100:0 for the 1.53 μm switching signal. Polarisation controllers 86 in the loop allowed us to operate the loop either in "reflecting" or "transmitting" mode. In reflection mode, the loop output was zero for the 1.56 μm signal, in the absence of the switching pulses, and the complete signal was reflected. The injection of the switching pulses caused the signal pulses to be switched to the output 88 of the loop 70. In transmitting mode, the situation was reversed, and the switched out pulses were reflected. The output of the loop 70 was connected to a filter 90, which passes the 1.56 μm signal and blocks the switching pulses. The remaining signal was amplified by an erbium fibre amplifier, detected by a photodiode 94, and then displayed on the sampling oscilloscope 76.

In order to establish the switching of this configuration, the mode-locked signal source 78 was replaced with a cw source operating at the same wavelength (1.56 μm). The 'effective' width of the switching pulse was determined by a combination of the difference in the group delay between the two wavelengths and the initial pulse width. The loop was set up in the reflecting mode, and the width of the pulse switched from the cw source was measured as 33 ps on the oscilloscope 76 which deconvolves to 25 ps. The initial pulse width was 16 ps, thus indicating a difference in dispersion between the two wavelengths of 3 ps/km. This established that, with this set-up, we should be able to demultiplex at up to 40 Gbit. Having established the suitability of the switching pulse width, the cw source was replaced by the mode-locked laser 78. In order that switching took place, it was necessary to synchronise the two trains of pulses. This was accomplished by having an adjustable delay in one arm of the clock pulses which drive the two sources.

Figure 8C:
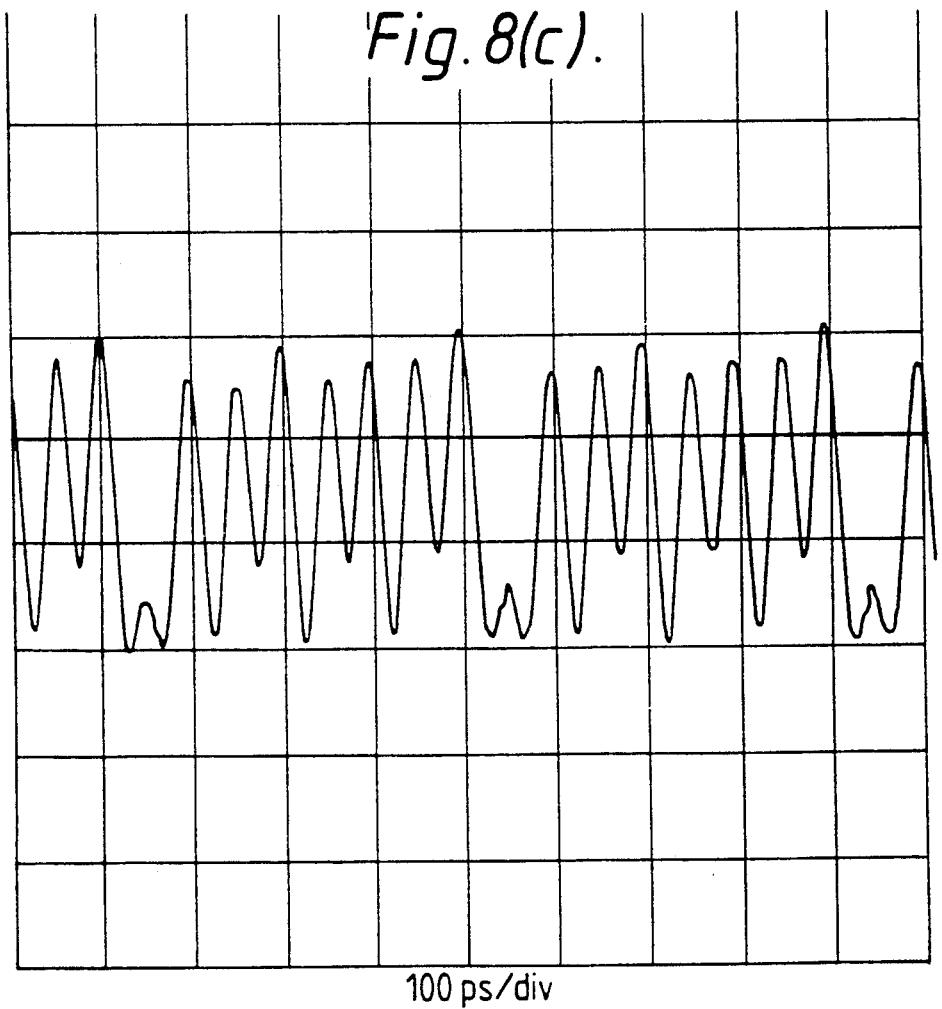
FIGS. 8 (a) to 8(c) are graphs showing the switching of a pulse train by the embodiment of FIG. 7.

In FIG. 8 we show the results. FIG. 8(a) shows the mode-locked, 1.56 μm "signal" pulse train at 20 Ghz. FIG. 8(b) shows the switched output with the loop in 'reflecting' mode, that is a transmission of only those pulses coinciding with the switching pulses i.e. every eighth pulse. FIG. 8(c) shows the result when the loop is set up in the 'transmitting' mode, and clearly shows every eighth pulse being switched out. There is still a small residual component of the switched-out pulse. This is because we may not be quite at the total switching energy. Increasing the amplification of the 1.53 μm pulses will result in more complete extinction.

We have shown that the NOLM is capable of switching multigigabit rates, and have demonstrated stable operation at the silica loss length (e.g. 6 km), allowing ultra-fast, all-optical processing to be performed entirely with semiconductor sources. This device is also capable of a number of non-linear processing functions, including pulse insertion, wavelength translation, logic and all-optical memory.

We claim:

1. An optical apparatus comprising:
    a first optical coupling means having first and a second pairs of optical communication ports, in which substantially equal portions of an optical signal received at a port of one pair of ports are coupled to each port of the other pair of ports;
    an optical waveguide means optically coupling the second pair of ports such that an optical signal at a first wavelength leaving either one of the second pair of ports in a first polarization state arrives at the other port of that pair in a second polarization state substantially orthogonal to the first polarization state;
    a second optical coupling means for coupling an optical signal at a second wavelength to the optical waveguide so as to propagate along at least a portion of it in one direction only; and
    first and second polarizing beam splitters, each of which is optically coupled to a respective one of the first pair of ports.

2. An optical apparatus as in claim 1, in which the optical waveguide includes a first polarization controller.

3. Optical apparatus as in claim 2, in which at least a portion of the optical fibre is polarization-maintaining fibre, and there is further included a second polarization controller.

4. A device as in claim 1, in which:
    the first optical coupling means is a dichroic optical coupler coupling most of an optical signal received at one port of the first pair of ports at the second wavelength to one port of the other pair,
    the second optical coupling means being positioned between the first polarizing beam splitter and the respective port of the first optical coupling means.

5. A device as in claim 4, further including a third optical coupling means positioned between the second polarizing beam splitter and the respective port of the optical coupling means for selectively extracting optical signals at the second wavelength.

6. A device as in claim 1, further including means for altering the optical path length of the optical waveguide.

7. A device as in claim 1, in which the optical waveguide comprises a silica optical fibre.

8. A device as in claim 1, further including an input polarization controller for controlling the polarization of optical signals at the first wavelength coupled to the first polarization beam splitter for onward propagation to the first optical coupling means.

9. A device as in claim 1, further including a further polarization controller coupled between the second polarizing beam splitter and the first optical coupling means.

10. An optical pulse signal switch for switching input optical pulses of a first wavelength from one optical path to another in response to optical control pulse signals of a second wavelength, said switch comprising:
an optical coupler having two pairs of ports;
an optical waveguide loop coupled to a first pair of said coupler ports and adapted in the absence of a switching optical signal of a second wavelength to change the polarization of an input optical pulse of a first wavelength so as to be orthogonal to its original input polarization state and, in the presence of a switching optical signal of a second wavelength, not to change the polarization of such input optical pulse or vice cersa; and
a beam splitter coupled to each the other pair of said optical coupler ports for separating optical signals having orthogonal polarization into respectively different optical signal paths.

* * * * *